United States Patent Office 3,184,958
Patented May 25, 1965

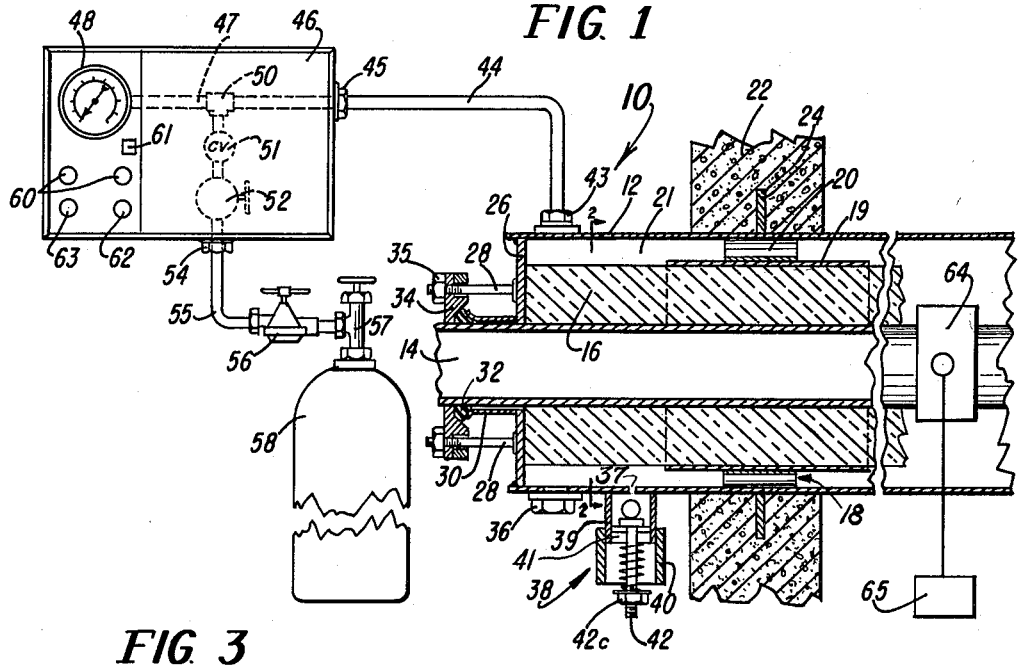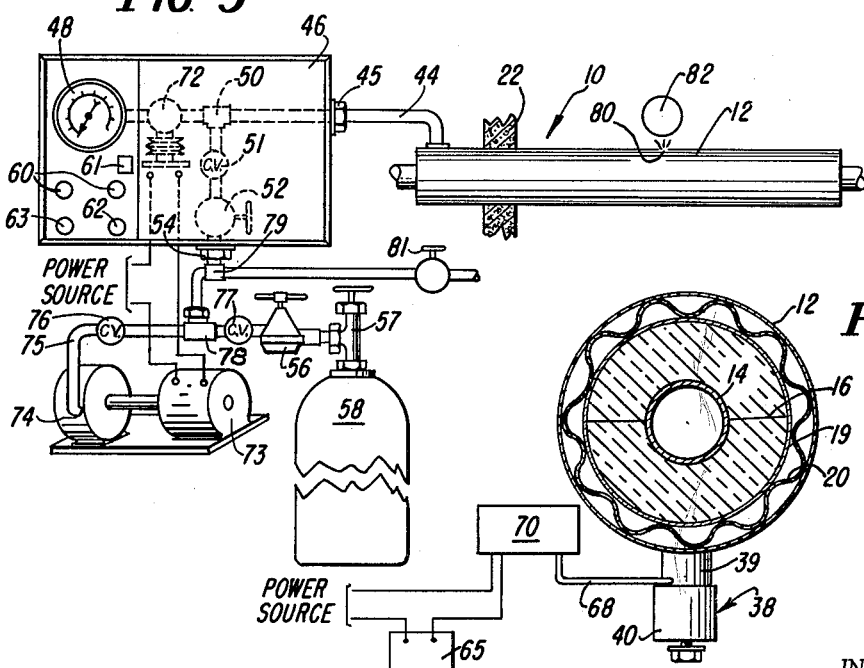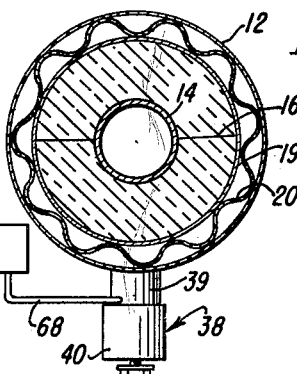

3,184,958
CONDUIT SYSTEM
Burton E. Eaton, Deerfield, Ill., assignor to Midwesco-Enterprise, Inc., a corporation of Illinois
Filed Mar. 11, 1963, Ser. No. 264,250
2 Claims. (Cl. 73—40.5)

This invention relates to a conduit system and, more particularly to a conduit system having low-moisture content inert gas monitoring means for indicating leaks in the conduit system and for increasing the operating efficiency of the conduit system.

Conduit systems of the type comprising one or more inner service pipes through which water or steam flows and an outer protective casing maintained in spaced relationship to the inner service pipes are finding increasing use today in many applications, such as for central station heating from a heating plant to a plurality of buildings remote from the heating plant. The conduit may be buried in the ground, or pass through tunnels beneath the surface, or may be above ground but in inaccessible or remote locations. Inspection and maintenance of such conduit system have been difficult. Pinpointing the location of a break in the outer casing was a problem.

Often it was found that the heat transfer losses from the hot water or steam carried in the inner pipe through the outer casing were relatively large. Uninsulated portions of the inner service pipe tended to sweat, causing corrosion on the exterior surface of the inner pipe. Further, condensed moisture often dropped onto the inner surface of the outer casing, causing corrosion thereto.

If the conduit system was disposed beneath the surface of the ground and a break developed in the outer casing, ground water might seep into the conduit system and cause further damage to the conduit system. Rain water might cause similar damage if the conduit system were above the ground.

An object of the present invention is to provide a novel conduit system having inert low-moisture content gas monitoring means therefor, whereby the disadvantages and deficiencies of prior systems are obviated.

A further object of this invention is to provide a conduit system having an inert low-moisture content gas monitoring arrangement provided therefor, whereby leaks in the conduit system may be readily detected and whereby the operating efficiency of the conduit system is materially increased.

Another object of this invention is to provide a conduit system with auxiliary means for pressurizing the annular space between the inner pipe and the outer casing to keep out moisture should a leak occur in the outer casing.

Still another object of this invention is to provide an improved method of detecting leaks in a conduit system and for monitoring the operation of a conduit system. These and other objects and advantages of the present invention will be readily perceived from the following description.

A preferred embodiment of the present invention is illustrated in the accompanying drawing, wherein like numerals refer to like elements and in which:

FIGURE 1 is a schematic view, partly in section, illustrating a portion of a conduit system embodying the monitoring arrangement of the present invention;

FIGURE 2 is a cross-sectional view taken generally along the line 2—2 of FIGURE 1; and FIGURE 3 is a schematic illustration of a modification of the monitoring arrangement shown in FIGURE 1, an arrangement including means to prevent moisture from entering the conduit system in the event that there is a break in the outer casing and means for detecting a leak in the outer casing.

Referring now to FIGURE 1, there is illustrated a schematic view of a portion of a conduit system embodying the monitoring arrangement of the present invention. The conduit system 10 comprises an outer, protective casing or conduit 12 disposed generally concentrically about an inner supply pipe conduit 14. Obviously two or more inner service pipes may be disposed within conduit 12. The inner service or supply pipes may be insulated or uninsulated or one may be insulated and one not insulated. As shown, insulation 16 is provided about the inner conduit 14 substantially along its entire length. The insulation may comprise full circles or split halves which are held together at spaced locations along the length of the inner conduit by spacing means 18, which comprise a sleeve 19 surrounding the insulation 16 and a spacer 20 acting between the sleeve 19 and the inner surface of the outer conduit 12 for maintaining the inner pipe 14 in spaced relation with respect to the outer casing 12. By virtue of this arrangement, an annular space 21 is provided between the exterior of the insulation 16 and the interior surface of the outer casing 12.

An end of the insulated conduit extends through the foundation wall 22 of a building. Disposed about the outer casing 12 is an annular leak plate 24 which is welded or otherwise affixed to the conduit and embedded in the foundation wall so as to fixedly retain the end of the insulated conduit system in the foundation wall 22.

Means are provided for closing the ends of the conduit so as to form a closed compartment between the inner pipe and the outer pipe. A closure plate 26 is welded or otherwise connected to the outer casing 12. A plurality of studs 28 are affixed at one end thereof to the closure plate 26 and extend outwardly therefrom along an axis generally parallel to the longitudinal axis of the inner pipe 14. Disposed about the inner pipe 14 is an annular spacer flange 30. At its outer end, the spacer flange 30 abuts a sealing gasket 32. A holddown plate 34 abuts the gasket 32 and pressure may be applied against the gasket by tightening the nuts 35 on the ends of the studs 28 to sealingly engage the gasket with the exterior of the inner pipe 14 and the flange 30 and thus seal off the annular space. The far end of space 21 is similarly sealed to define a closed compartment within the conduit system. Other seal arrangements which allow the inner service pipe or pipes to move longitudinally with heat application may be used.

Provided in the bottom of the outer casing 12 is a drain plug 36 which may be removed to permit the drainage of condensation or water from within the outer casing.

Also provided in the bottom of the outer casing 12 are safety relief valve means 38 for relieving excess pressure in the annular space 21 which may be caused, for example, by a break in the inner pipe. The valve means are adjustable so that they can be set at a predetermined pressure for each conduit system. The relief valve means may comprise concentric sleeves or housings 39 and 40 connected in axial offset relation with smaller sleeve 39 communicating with opening 37 in casing 12. A normally closed spring-biased valve 41 positioned in sleeve 39 is movable into enlarged sleeve 40 to permit flow bypass around valve 41. The spring bias of the relief valve may be regulated by rotating adjustment nut 42c on stem 42. Relief valve means 38 is mounted so as to face downwardly. In a typical installation, the safety relief valve is set to open at 25 pounds per square inch to vent the conduit system of water or steam in the event the inner service pipe 14 fails and releases excessive pressure into annular space 21.

The monitoring arrangement which comprises an important feature of this invention comprises a control panel 46, which is connected to the annular space 21 within the conduit means by means of line 44. Fittings 43 and 45 are provided at each end of line 44 to connect the line to the outer casing 12 and to the control panel 46, respectively.

Within the control panel 46 are suitable valves which are constructed and arranged to cooperate with a filling system wherein an inert, low-moisture content gas may be supplied to the annular space 21 at a predetermined pressure. It has been ascertained that the use of an inert, low-moisture content gas, such as nitrogen, in the annular space 21, will minimize the heat transfer losses through the annular space and through the outer casing. Operating efficiency of the system is increased for thermal losses are reduced. Further, the use of an inert, low-moisture content gas in the annular space 21 will obviate sweating of the uninsulated inner service pipe and will thus minimize the energy loss, since the inert gas has negligible water vapor when compared to air. The internal surface of the casing 12 will not rust since the moisture content inside the casing is very low and because the inert gas will not cause oxidation.

Provided on the control panel 46 is a pressure gauge 48, which communicates with the line 44 via line 47 and T 50. Also provided in the control panel are a check valve 51 and an manual cut-off valve 52.

When it is desired to charge the system with the inert gas, a line 55 is connected at one end to the charging port or fitting 54. At the other end, line 55 is connected to a pressure regulator 56. The pressure regulator is in turn connected with a manual cut-off valve 57 on the inert gas storage tank 58. To charge the annular space with the inert gas, the valves 57 and 52 are opened. Gas will flow from the storage tank 58 into the annular space 21. It is preferred that a pressure on the order of 5 pounds per square inch be utilized. When the desired pressure is obtained in the closed compartment in the conduit system, as indicated on the pressure gauge 48, the valves 52 and 57 may be closed and the tank may be removed from the system.

An important feature of this invention lies in the initial charging of inert gas into the conduit system. Initially, a charge of gas at a pressure of approximately 5 pounds per square inch is introduced into the annular space when the system is cold and inoperative. It has been found that a certain amount of nitrogen gas is absorbed into the insulation within the conduit system. Accordingly, it has been ascertained that by waiting a period of approximately 72 hours, the majority of the absorption of the nitrogen gas into the insulation will have taken place. Then the system is given a second charge up to the desired 5 pounds per square inch of pressure. Additional absorption of nitrogen into the insulation is minimal and any loss of pressure within the conduit system would be indicative of a leak in the system.

Also provided on the control panel 46 are audio and visual indicating means, comprising an alarm indicator 62 and a plurality of indicator lights 60 which would evidence leak occurrences in the system. An audio alarm is provided in addition to the visual alarm indicator 62 and it is understood that alarm silencer button 63 will be actuated to turn off the audio alarm without losing the visual indication of difficulty or leak in the conduit system. The indicators are responsive to pressure loss within the closed compartment. The gauge button 61 may be provided so that the gauge 48 will register only when the gauge button 61 is depressed.

Turning now to FIGURE 2, there is illustrated a cross-sectional view of the conduit system taken generally along the line 2—2 of FIGURE 1. It is seen that the annular sleeve 19 extends about the insulation 16 and maintains the insulation in position about the inner service pipe 14. The spacer means 20, which preferably comprise a corrugated annular member are of the type shown and described with particularity in patent application Serial No. 177,675, filed by Burton E. Eaton on March 5, 1962, now Patent No. 3,126,918.

The safety relief valve means 38, which depends downwardly from the outer casing 12, may be connected to an external drain if desired. Connected to the housing 39 of relief valve means 38 by means of a conduit 68 is a rupture sensor mechanism 70 which is set at a lower value than the safety valve means so as to sense a service pipe leak just before the casing is vented. The rupture sensor is in turn connected to the control 65 so that in the event of a rupture of an inner pipe 14, the rupture sensor mechanism 70 will actuate control 65 to terminate operation of the pump 64, which may be utilized to force water or steam through the inner pipe 14. It will be appreciated that control 65 may be utilized to actuate other system flow regulators, as for example, flow control valves.

Turning now to FIGURE 3, there is illustrated a modified arrangement for monitoring conduit system 10. The modified arrangement includes means for pressurizing the closed compartment defined within the conduit system 10 when there is a break in the outer casing of the conduit system so as to permit the conduit system to remain in operation at high operating efficiency until repairs can be later made when weather conditions permit and repair equipment is available. Such means include a pressure control switch or pressurestat 72 mounted within the control panel 46, the pressurestat 72 being adapted to actuate a motor 73 which drives an air compressor 74 to cause pressurization of the annular space within conduit system 10 at a head greater than ground water about the subterranean disposed conduit system.

The air compressor 74 discharges pressurized air through the line 75 and check valve 76 contained therein, through the T 78 and through the open manual shut-off valve 52 and check valve 51, through the T 50, and through the line 44 into the annular space 21 defined between the inner pipe and the outer pipe in the conduit system. In this manner, ground water and moisture can be kept out of the conduit system in the event of a break in the outer casing.

Another feature of the arrangement of FIGURE 3 is the provision of means for detecting the precise break point or leak point in the outer casing 12. A valved conduit is adapter to be connected to the line 79. When the valve 81 in the conduit is opened, a short half-life radioactive isotope or other radioactive material may be introduced into the conduit system 10. With the air compressor operating, the isotope will be moved along in the conduit and leave the conduit at the break point 80. An operator having a detector means 82, as for example, a Geiger counter, may walk along the pipe, which is either buried in the ground or maintained above the ground, until the Geiger counter senses the high radioactivity at the breakpoint 80 in the conduit system 10.

It will be understood that in the event that there were a break in the conduit system, as at point 80, the alarm indicator light 62 on the control panel 46, as well as the audio alarm associated therewith, would be activated to indicate the failure to the operator of the system. In the arrangement of FIGURE 3, the air compressor 74 is automatically actuated by closure of the contacts of pressure switch 72 to maintain pressure within the annular chamber 21 and prevent the entrance of ground water into the conduit system in the event the conduit system is of the subterranean type.

Should a leak occur, the approximate size thereof may be determined by measuring the volume of air pumped into the conduit system. If the volume of air necessary to maintain system pressure is small, the leak is small. If the volume of air introduced into the conduit system cannot maintain pressure, then the fracture or break is large. Therefore, a correlated flow rate indicator could be used to measure the relative size of the break in the outer casing.

The inert low-moisture content gas may be charged initially into the system of FIGURE 3 in the same manner as with the system of FIGURE 1 by means including the tank 58, which supplies the inert low-moisture content gas, such as nitrogen, and the auxiliary valving for regulating the flow of gas from the tank into the system.

With the monitoring arrangement of this invention in operation, it is possible to ascertain the physical condition of the conduit system with respect to its tightness at any time, whether such conduit system be located at an inaccessible place on the surface of the ground or below ground level. The control panel, usually located within a building, will automatically notify the user if there is any damage to either the inner or outer pipe. Introduction of an inert low-moisture content gas into the annular space between the inner service pipe and the outer casing will result in an improvement in thermal conductivity or K factor, which results in less energy loss or less heat transfer through the annular space 21. Further, the portions of the inner service pipe within the casing which are uninsulated will not sweat and lose energy in the inert gas environment since the low-moisture content inert gas has negligible water vapor when compared to air. This also results in minimization of rusting of the outer surface of uninsulated inner pipe or the inner surface of the outer casing. The present invention provides a unique monitoring arrangement for a conduit system, such arrangement improving the operating efficiency of the conduit system and facilitating detection of leaks in the conduit system.

The control devices may be remotely located or they may be integrated into a control panel in another building as the only connection required from each closed compartment is line 44.

Several closed compartments could be monitored from one central control panel, for example, by connecting each line 44 from a separate closed system to a manifold connected to the central control panel. Suitable electrically-actuated shut off valves could be provided in each line. Preferably, each closed compartment or system would have its own rupture sensor. The shut off valves and rupture sensors are connected in circuit. Upon failure of any system and actuation of the associated rupture sensor, the air compressor (FIGURE 3) would start. Simultaneously, the shut off valves in the other lines from the manifold will be closed.

The above disclosure has been given by way of illustration and elucidation, and not by way of limitation, and it is desired to protect all embodiments of the herein disclosed inventive concept within the scope of the appended claims.

I claim:

1. A method of detecting leaks from within a subterranean conduit section comprising an inner service pipe and an outer protective casing spaced therefrom so as to define an annular space therebetween, said method comprising the steps of sealing a predetermined portion of the annular space from the atmosphere, charging the annular space between the service pipe and the outer casing with pressurized, inert, low-moisture content gas to minimize heat transfer between said service pipe and said outer casing and to maintain a dry atmosphere within said closed compartment, sensing a pressure loss within the annular space between the service pipe and the outer casing to detect a leak, and charging a pressurized fluid into the annular space at a pressure greater than that of the ground water surrounding the conduit section in response to sensing a predetermined pressure loss to keep said annular space free from such ground water.

2. In a conduit system, a conduit section adapted to be installed in the ground comprising a first inner pipe for conducting a fluid and a second outer pipe concentric to and spaced from said inner pipe so as to define an annular space therebetween, there being undesirable heat transfer between the fluid in said inner pipe and said outer pipe, means for sealing a predetermined portion of said annular space to define a closed compartment, means for introducing pressurized inert, low-moisture content gas into said closed compartment to minimize said heat transfer and to maintain a dry atmosphere, thereby reducing oxidation within said closed compartment, means for sensing the pressure loss within the sealed compartment to detect a leak, and pump means operative in response to a predetermined pressure loss in said closed compartment for pumping a pressurized fluid into said closed compartment at a pressure at least equal to the pressure from the ground water adjacent said conduit section to keep said closed compartment free from ground water in the event there is a leak in said outer pipe.

References Cited by the Examiner
UNITED STATES PATENTS

| | | | |
|---|---|---|---|
| 1,985,348 | 12/34 | Henneberger | 73—40.5 |
| 2,518,327 | 8/50 | John. | |
| 2,540,049 | 1/51 | Henson. | |
| 2,788,658 | 4/57 | Liden | 73—40.5 |
| 2,996,661 | 8/61 | Roberts | 73—40.7 X |

ISAAC LISANN, *Primary Examiner.*